Sept. 13, 1949.　　　　S. HILLER, JR　　　　2,481,746
HELICOPTER
Filed March 27, 1946　　　　　　　　　　　　　2 Sheets-Sheet 1

INVENTOR.
STANLEY HILLER JR.
BY
ATTORNEYS.

Sept. 13, 1949.          S. HILLER, JR         2,481,746
HELICOPTER
Filed March 27, 1946                          2 Sheets-Sheet 2
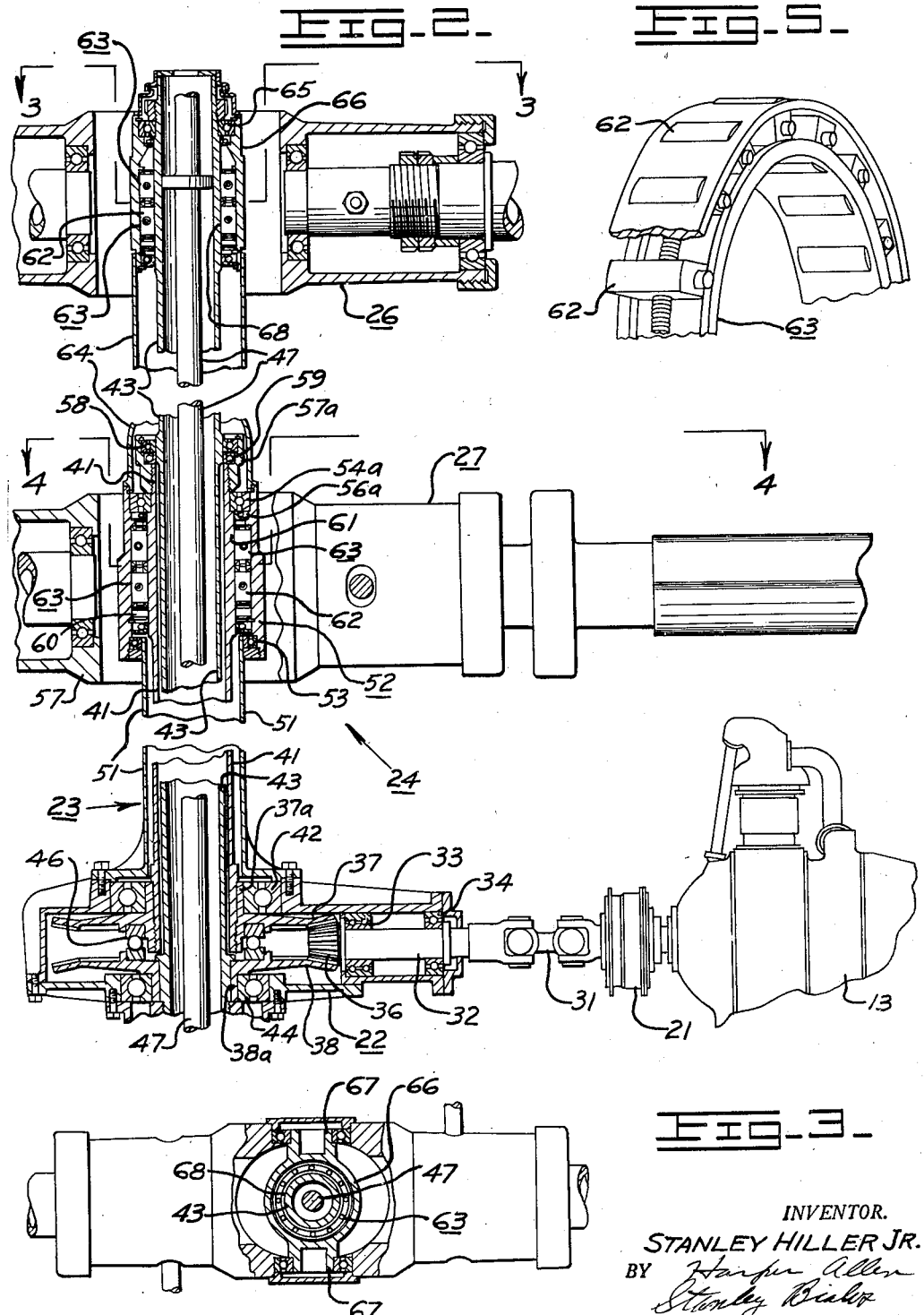
INVENTOR.
STANLEY HILLER JR.
BY Harper Allen
Stanley Bishop
ATTORNEYS.

Patented Sept. 13, 1949

2,481,746

UNITED STATES PATENT OFFICE 2,481,746

HELICOPTER

Stanley Hiller, Jr., Berkeley, Calif., assignor to United Helicopters, Inc., Palo Alto, Calif., a corporation of California Application March 27, 1946, Serial No. 657,372

1 Claim. (Cl. 170—135.75)

This invention relates to helicopters and is concerned more particularly with the provision of an improved drive structure for a helicopter wing which will increase the safety of operation by providing for auto-rotation of the wing structure in the event of any failure in the power plant or drive mechanism thereof.

In the design of prior helicopter structures it has been recognized that it is desirable to provide for auto-rotation of the wing structure in the event of a power plant failure so that the fall of the helicopter will be retarded to a safe rate by the auto-rotation of the wings. However, such prior structures have failed to take into account other possible failures of the drive mechanism, such as failure of a drive shaft, failure of the gear mechanism, or freezing of a bearing in the drive connections.

In accordance with the instant invention, the drive mechanism of the helicopter wing structure is so constructed that it takes full advantage of auto-rotation to provide a safety factor in the helicopter for failure of any character in the power plant and the drive connections therefrom. This is effected by constructing the drive head structure of the helicopter to incorporate a free wheeling unit immediately adjacent the wing structure and in a preferred location with respect to the various parts of the drive mechanism which may fail.

Accordingly, it is a general object of the invention to provide an improved helicopter embodying maximum use of the safety factor of auto-rotation of the wing structure in the event of a failure in the drive therefor.

Another object of the invention is to provide a free wheeling or auto-rotation unit in the drive head structure of a helicopter.

A further object of the invention is to provide an advantageous free wheeling drive connection between a wing structure of a helicopter and the drive shaft therefor.

Other objects and advantages of the invention will be apparent from the following description of a preferred embodiment thereof as illustrated in the accompanying drawings, in which:

Figure 2 is a vertical sectional view taken in a plane containing the axis of the drive head structure with certain intermediate portions of the drive and housing connections broken away for compactness of the view.

Figure 3 is a fragmentary horizontal view of the mounting and connection of the upper wing structure to its drive shaft, the view being taken as indicated by the line 3—3 in Figure 2.

Figure 5 is a fragmentary perspective view of a suitable form of free wheeling unit.

As previously stated, the present invention is concerned with an improved drive arrangement for the wing structure of a helicopter to provide for auto-rotation thereof in the event of drive failure and is generally applicable to various types of helicopters. For purposes of illustration, I have shown the invention as embodied in a helicopter employing respective upper and lower wing structures which rotate in opposite directions.

Figure 1:
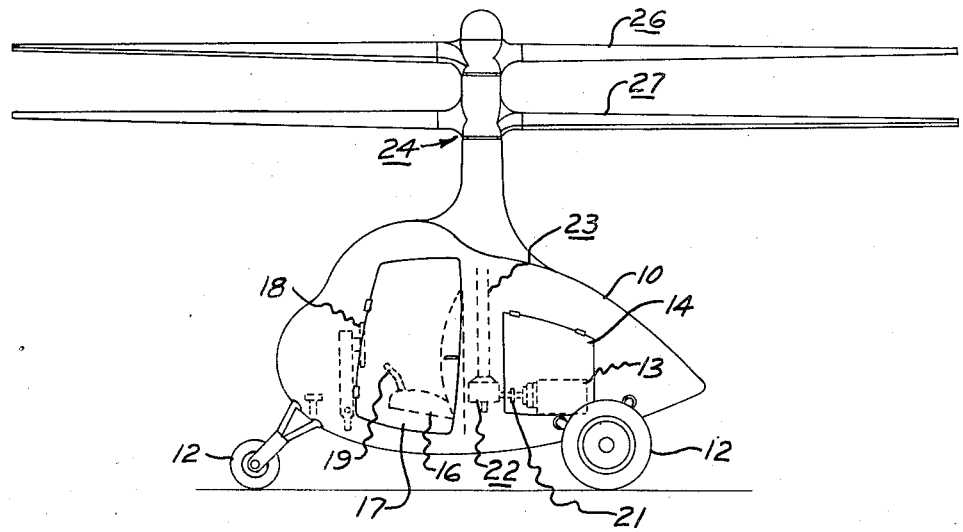
Figure 1 shows somewhat schematically a side elevation view of a typical helicopter embodying the instant invention with certain portions thereof shown in dotted lines.

Referring to Figure 1, the helicopter may comprise a body 10 having a suitable form of landing gear 12 thereon. The wheel type of landing gear shown is merely illustrative. Within the body 10 there is provided a power plant 13 to which access may be had through a door 14. Forwardly of the power plant 13 there is provided a seat 16 to which access may be had through a door 17. Various operating controls of the helicopter are shown in the pilot's compartment including a wheel 18 and a control post 19. The drive from the power plant 13 may be transmitted through a suitable form of clutch 21 and a gear box 22 to a vertically disposed tubular shaft structure 23 extending upwardly into and forming a part of a drive head structure indicated generally at 24 which carries and drives the respective upper and lower wing structures 26 and 27.

Referring to Figure 2 of the drawings, the power plant or engine 13 is connected by the clutch 21 and a conventional form of universal drive connection 31 with a stub shaft 32 which is journaled by respective bearings 33 and 34 within the gear casing 22. The gear casing 22 is suitably secured within the body 10 and forms the support or base for the drive head structure 34. The stub shaft 32 carries a bevel pinion 36 which meshes with respective upper and lower bevel gears 37 and 38. The gear 37 has its hub 37a threaded to receive a tubular drive shaft 41 for the lower wing structure 27. The gear hub 37a is journaled by means of an upper main support bearing 42 within the gear casing 22. Correspondingly, the lower bevel gear 38 has its hub 38a secured to the lower end of an inner tubular drive shaft 43 for the upper wing structure 26, The gear hub 38a is journaled by lower main support bearing 44 within the gear casing 22. A thrust bearing 46 is interposed between the respective bevel gears 37 and 38.

The above described drive and bearing support structure serves as the base for the drive head structure and is of generally conventional design. A conventional form of control rod 47 extends upwardly through the hollow drive shaft 43.

As previously stated, the instant invention provides an improved drive mechanism wherein a free wheeling unit provides for auto-rotation of the wing structure in the event of failure of the drive and this free wheeling unit is advantageously located immediately within the hub of the wing structure so that all possible drive failures will be compensated for.

Figure 4:
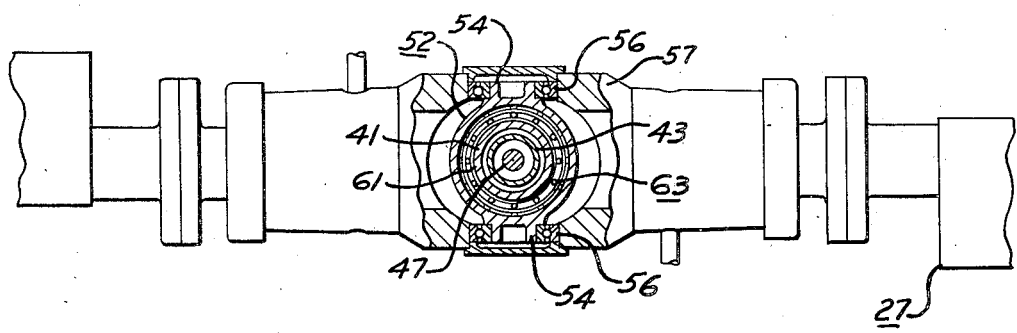
Figure 4 is a view similar to Figure 3 of the lower wing structure taken as indicated by the line 4—4 in Figure 2.

Referring to Figures 2 and 4, the tubular drive and support shaft 41 for the lower wing structure extends upwardly within a tubular housing 51 which is secured on the gear casing 22 and is journaled within the drive hub 52 of the wing structure 27 by means of a bearing 53. As seen in Figure 4, the drive hub 52 is provided with oppositely disposed trunnions 54 which provide a pivotal support by means of respective bearings 56 for the central support hub 57 of the wing structure 27 so that the wing structure is mounted for pivotal movement about an axis transverse to the axis of the rotation of the drive shaft therefor. The drive hub 52 of the wing structure is provided with a journaled connection to the upper end of the drive shaft 41 by means of an upper support bearing 54a having a seal ring 56a associated therewith and disposed below a retainer nut 57a within which the inner drive shaft 43 is journaled by means of a bearing 58 having a seal ring 59 adjacent thereto. The enlarged portion 61 of the drive shaft 41 provides the effective driving portion of the drive shaft which is adapted to transmit the drive through the wedge cam elements 62 of a pair of free wheeling units 63 seated within the drive hub 52 above a lower support bearing 60 of the roller type. The free wheeling units are positioned to transmit the drive in a counterclockwise direction of rotation as viewed from above the helicopter.

Figure 5 shows a suitable conventional form of free wheeling unit known as the "Rockford" free wheeling unit as illustrated in the drawings although any other suitable form of free wheeling unit can be employed.

The inner tubular drive shaft 43 (Figures 2 and 3) is provided with a driving connection to the upper wing structure 26 generally similar to that described in connection with the lower wing structure. The drive shaft 43 extends upwardly from its journaled connection at 58 with the outer tubular drive shaft 41 within a tubular housing 64 and is provided with a journaled connection to the cooperating drive hub 66 by means of a bearing 65. The drive hub 66 is provided with trunnions 67 on which the upper wing structure 26 is pivotally supported and also seats a pair of free wheeling units 63 through which it is driven from the enlarged portion 68 of the drive shaft 43. These upper free wheeling units 63 are disposed to be operative in a clockwise direction of rotation of the upper wing structure as viewed from above the helicopter.

From the above description it will be noted that in each case the safety free wheeling structure for each wing structure is disposed immediately within the drive hub for the cooperating wing structure in an optimum position to provide for auto-rotation of the wing structure in the event of any failure of the drive of the cooperating drive shaft. At the same time this advantageous location for the free wheeling or auto-rotation units provides a simple yet sturdy method of mounting for these units.

While I have shown a preferred embodiment of my improved helicopter drive mechanism to provide for auto-rotation of either or both wings in the event of a failure of the drive mechanism therefor, it will be apparent that the invention can be embodied in other forms without departing from the scope of the claim appended hereto.

I claim:

In a helicopter, a body, a power unit in the body, a drive head structure projecting upwardly from the body and including a vertically disposed drive shaft having a drive connection with the power unit, a wing structure including a first hub about said drive shaft and a second hub mounted for pivoting movement on the first hub about an axis transverse to the axis of said drive shaft, said second hub being connected to a wing, spaced bearings journalling said first hub about an upper portion of the drive shaft, a main support bearing between said body and said drive shaft adjacent the lower end of the drive shaft, and a free wheeling unit disposed between said spaced bearings and having its inner support rim upon the drive shaft and its outer support rim within the first hub of the wing structure to provide for overdriving of the wing structure in the event of failure of the drive therefor.

STANLEY HILLER, Jr.

REFERENCES CITED

The following references are of record in the file of this patent:

UNITED STATES PATENTS

| Number | Name | Date |
|---|---|---|
| 1,485,704 | Pescara | Mar. 4, 1924 |
| 1,798,628 | Pillard | Mar. 31, 1931 |
| 1,971,033 | Cierva | Aug. 21, 1934 |
| 1,980,999 | Larsen | Nov. 20, 1934 |
| 2,410,459 | Platt | Nov. 5, 1946 |
| 2,340,241 | Woods | Jan. 25, 1944 |
| 2,352,404 | Pitcairn | June 27, 1944 |
| 2,428,128 | Sheppard | Sept. 30, 1947 |